United States Patent [19]

Dischert

[11] Patent Number: 4,725,880
[45] Date of Patent: Feb. 16, 1988

[54] COLOR SOLID-STATE IMAGING APPARATUS WHEREIN ONE IMAGER RECEIVES AN IMAGE OF A FIRST COLOR AND ANOTHER IMAGER RECEIVES AN OFFSET IMAGE OF THE FIRST COLOR AND A SECOND COLOR

[75] Inventor: Robert A. Dischert, Burlington, N.J.
[73] Assignee: RCA Corporation, Princeton, N.J.
[21] Appl. No.: 749,810
[22] Filed: Jun. 28, 1985
[51] Int. Cl.[4] .................... H04N 9/09; H04N 9/04; H04N 9/097
[52] U.S. Cl. .................................. 358/43; 358/41; 358/55
[58] Field of Search .............. 358/41, 43, 50, 52, 358/55; 350/173 (U.S. only)

[56] References Cited

U.S. PATENT DOCUMENTS

| | | | |
|---|---|---|---|
| 3,652,786 | 3/1972 | Morishita | 358/50 |
| 3,975,760 | 8/1976 | Yamanaka et al. | 358/41 |
| 4,016,598 | 4/1977 | Yamanaka | 358/41 |
| 4,322,740 | 3/1982 | Takemoto et al. | 358/50 |
| 4,334,238 | 6/1982 | Morishita et al. | 358/43 |
| 4,507,679 | 3/1985 | Bendell | 358/55 |
| 4,555,163 | 11/1985 | Wagner | 358/55 |
| 4,642,677 | 2/1987 | Takanashi et al. | 358/43 |

FOREIGN PATENT DOCUMENTS

| | | | |
|---|---|---|---|
| 0135300 | 3/1985 | European Pat. Off. | 358/41 |
| 163977 | 12/1980 | Japan | 358/43 |
| 36283 | 4/1981 | Japan | 358/43 |
| 36284 | 4/1981 | Japan | 358/43 |

*Primary Examiner*—James J. Groody
*Assistant Examiner*—Randall S. Svihla
*Attorney, Agent, or Firm*—Eugene M. Whitacre; Peter M. Emanuel; James B. Hayes

[57] ABSTRACT

A solid-state color imaging apparatus comprising a beamsplitter for splitting an incoming light beam representative of an image into at least first and second light beams corresponding to a first color band (e.g., green) of the incoming light and the first color band and a second color band (e.g., blue) of the incoming light, respectively, and first and second solid-state imagers disposed for receiving respective ones of the light beams. The first imager is optically offset with respect to the second imager and their output signals processed so as to develop an apparently improved resolution signal for light of said first color band when compared to the signal developed for light of said second color band.

20 Claims, 3 Drawing Figures

COLOR SOLID-STATE IMAGING APPARATUS WHEREIN ONE IMAGER RECEIVES AN IMAGE OF A FIRST COLOR AND ANOTHER IMAGER RECEIVES AN OFFSET IMAGE OF THE FIRST COLOR AND A SECOND COLOR

FIELD OF THE INVENTION

The present invention relates to a solid-state color imaging apparatus using a beamsplitting technique to improve the apparent resolution of an image representative signal.

BACKGROUND OF THE INVENTION

The resolution of a solid-state imager depends upon how many discrete solid-state photosensors are included in its imaging area. Some solid-state imagers do not include enough discrete photosensors for obtaining a high resolution television signal suitable for commercial broadcast applications. Although imagers having a greater number of discrete photosensors can be manufactured, the processing yield is relatively low due to imager (photosensor) defects which greatly increase in number with modest increases in the number of discrete photosensors in a given imaging area. Therefore, it is desirable to have an imaging arrangement which provides high resolution image signals while utilizing solid-state imagers having less than the number of discrete photosensors conventionally required.

To increase the apparent resolution of a solid-state imager, it is known to split light representative of an image into two light images and dispose two solid-state imagers so as to receive respective ones of the images. The imagers are positioned so that the image received by one of the imagers is spatially offset or displaced one-half of the width of an individual image photosensor (pixel) with respect to the image received by the other imager. This spatial offset results in the sample signals supplied by the imagers to have carrier and sideband components 180° out-of-phase with respect to each other. A time delay at the output of one of the imagers is used to temporally align the imager output sample signals in a manner so as to compensate for the spatial offset. The imager output signals are then combined whereby the mutually out-of-phase carrier and alias components cancel each other and result in a signal having an apparent increase in its resolution. This technique is applied to a color television camera including three solid-state imagers in U.S. Pat. No. 4,334,238 issued June 8, 1982, to Morishita et al., and assigned to Nippon Electric Company. A block diagram of this camera is shown in FIG. 1 herein and includes a lens 10 for focusing an image of an object 12 through a beamsplitting prism 14 onto the photosensitive imaging area of three solid-state imagers 16, 18 and 20. Beamsplitting prism 14 includes prism blocks 22, 24 and 26 for coupling the green (G) light from the object through a boundary surface 28 while the red (R) and blue (B) light are reflected from surface 28. The green light passing through surface 28 is equally divided by a partially reflecting/transmitting surface 30, such as a half-silvered mirror, with one-half the green light passing through surface 30 to imager 18 and the other half being reflected by surfaces 30 and 28 to imager 16. Imagers 16 and 18 are physically positioned with respect to their received focused images so that a point in the image focused on imager 18 is spatially displaced one-half of a pixel width with respect to the positioning of the corresponding point in the image focused in imager 16. Due to this one-half pixel offset, the carrier and sideband portions of the image-representative sample signals supplied by imagers 16 and 18 are 180° out-of-phase with respect to each other while the baseband signal portions remain unchanged. These green signals are temporally aligned by sampling them with circuits 32 and 34, respectively, which receive 180° out-of-phase sampling signals derived by an oscillator 36 in conjunction with a sampling pulse generator 38. The output of sampling circuits 32 and 34 are combined thereby cancelling the mutually out-of-phase alias components and resulting in an apparent improvement in resolution, and applied to a green signal processor 40 for developing the green video signal.

The red and blue light reflected from surface 28 exits from prism block 26 and passes through an optical low-pass filter 42 and a red/blue color encoding filter 44 before reaching imager 20. Optical filter 42 reduces the amount of spurious signals produced in the output of imager 20 due to aliasing between the optical image and the imager pixels. Color encoding filter 44 allows the red component of the light to fall on alternate pixels of imager 20 while blocking the blue light and allows the blue light to fall on the remaining pixels while blocking the red light. Thus, imager 20 provides an output signal which alternately (on a pixel-by-pixel basis) represents the red and blue color components, respectively, of the light received from object 12. Sampling circuits 46 and 48 sample the red and blue components, respectively, of the output signal from imager 20 in response to 180° out-of-phase sampling signals provided from sampling pulse generator 50 for developing, in conjunction with red and blue processors 52 and 54, respectively, red and blue video signals. Although this arrangement improves the apparent resolution of the green signal component, which is desirable since image pick-up devices are typically more sensitive to this color component than to the red or blue color components, the use of a color encoding filter is disadvantageous because it reduces the light sensitivity for the red and blue color components by 50% due to transmission losses. Furthermore, this arrangement requires precision registration of the color encoding filter with the individual pixels of the third imager. Additionally, since the red and blue signals are derived from alternate pixels of a single imager, these signals necessarily have a reduced resolution with respect to the signals which would be provided if they were each derived from their own imager.

U.S. Pat. No. 4,507,679 issued to Bendell on Mar. 26, 1985, and assigned, like the present application, to RCA Corporation, relates to a color television camera including a beamsplitter having four output ports which improves the apparent resolution of one of the color signals without reducing the resolution of the others. Specifically, two output ports are used for deriving a high resolution green signal in a manner substantially the same as previously described and red and blue signals are each derived from their own solid-state imagers associated with corresponding third and fourth output ports of the beamsplitter. Although this arrangement provides an improved resolution green video signal and red and blue video signals without reduced resolution, a four port prism and four solid-state imagers are required.

Thus, there is a need for a camera which improves the apparent resolution of one of the color signals without reducing the resolution of the others but which requires a beamsplitter arrangement having only three output ports and only three solid-state imagers. Such a three-port arrangement is less complicated than a four-port arrangement and also consumes less power.

SUMMARY OF THE INVENTION

In accordance with the principles of the present invention a solid-state color imaging apparatus comprises optical means for splitting an incoming light beam into at least first and second light beams and first and second solid-state imagers disposed to receive the first and second light beams. The first light beam corresponds to light within a first color band and the second light beam corresponds to light within the first color band and also within a second color band. The light beam received by the first imager is offset with respect to the light beam received by the second imager so that when the output signals are processed (e.g., in a television camera) an apparently improved resolution signal is developed in response to light within the first color band when compared to the signal developed in response to light within the second color band.

DETAILED DESCRIPTION OF THE INVENTION

Figure 2:
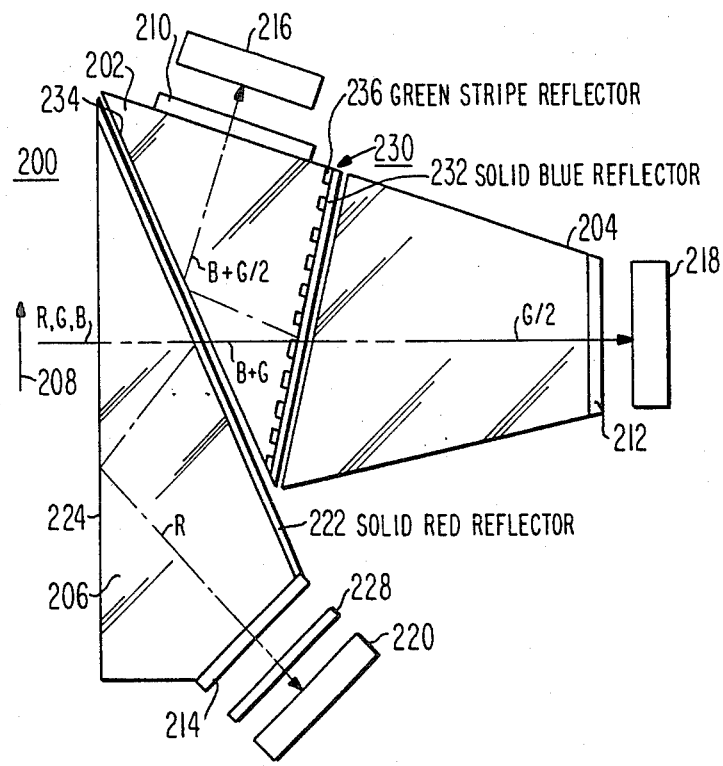
FIG. 2 illustrates in block diagram form a solid-state color imaging apparatus in accordance with the invention.

FIG. 2 illustrates a solid-state color imaging apparatus according to the invention and includes a beamsplitter 200 including three prism blocks 202, 204 and 206 for splitting an incident light beam from an object 208 into three light beams each including different spectral distributions (i.e., color bands). Each of prism blocks 202, 204, 206 includes a respective exit port 210, 212, 214 for providing a light beam representative of an image to a corresponding one of three solid-state imagers 216, 218, 220 associated with its respective exit port. Imagers 216, 218, 220 may each comprise CCD (charge coupled device) imagers of the frame-transfer type, such as the SID 504 CCD imager commercially available from RCA Corporation.

Prism block 206 includes a boundary 222 comprising a red reflecting layer which reflects the red component of the incident light beam and passes the green and blue components into prism block 202. The reflected red component is also reflected from the light entrance face 224 of prism 206 and passes out through exit port 214 through an optical low-pass filter 228 and is received by imager 220. Optical low-pass filter 228 is used to remove components in the light beam having spatial frequencies which may cause aliasing in the red signal provided from imager 220. The green and blue light passes through prism block 202 to a boundary 230 which includes a layer 232 for reflecting the blue component is also reflected from surface 234 of prism 202 and passes out through exit port 210 where it is received by imager 216. Boundary 230 also includes a layer 236 comprising a green reflecting pattern, such as spaced parallel green reflective stripes. Layer 236 reflects a portion of the green light to imager 216 via surface 234, and passes the remainder of the green light through exit port 212 of prism block 204 to imager 218. If layer 236 comprises a pattern of green reflecting stripes of equal width spaced apart from each other by the same width, the green light will be equally divided between imagers 216 and 218 (i.e., one-half of the green light to each of imagers 216 and 218). The width and spacing of the stripes may be modified to divide the green component in a different proportion, if desired. A more detailed description of a beamsplitter including a boundary similar to boundary 230 noted above can be found in U.S. patent application Ser. No. 534,710 issued on Nov. 26, 1985, as U.S. Pat. No. 4,555,163 to T. M. Wagner and assigned, like the present application, to RCA Corporation. In summary, each pixel of imager 216 receives both blue and green light while each pixel of imager 218 receives only green light.

Figure 1:
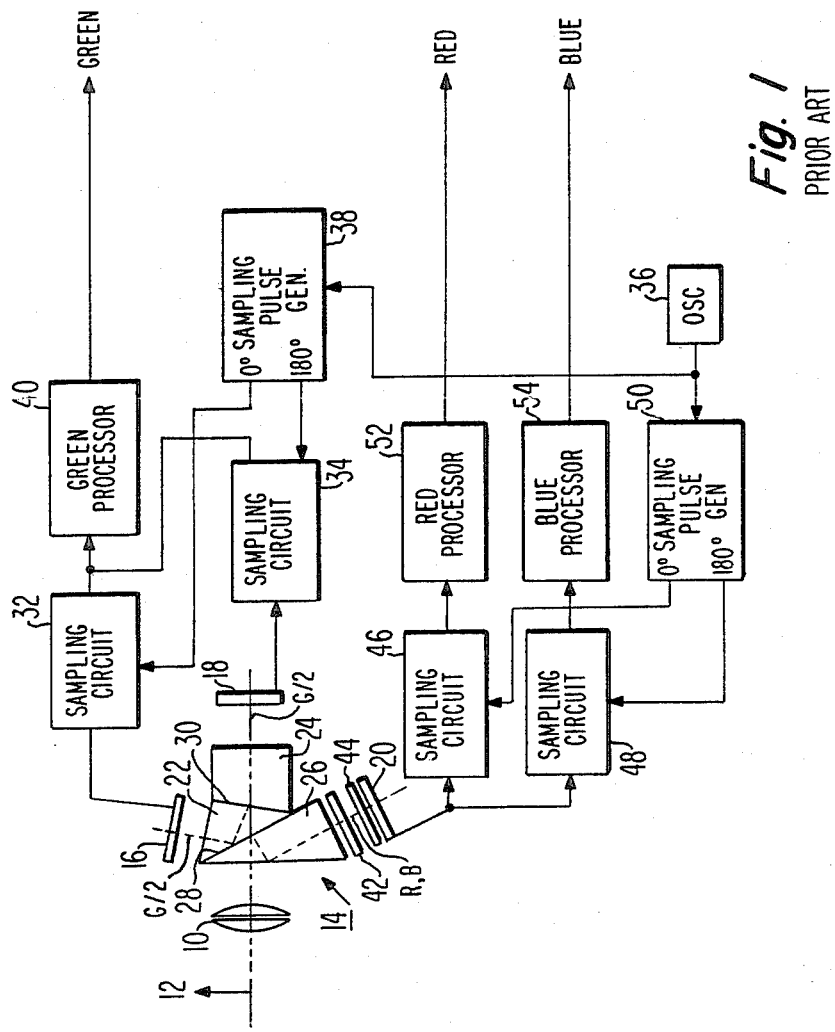
FIG. 1 illustrates in block diagram form a solid-state color television camera in accordance with the previously described prior art.

Imagers 216 and 218 are associated with exit ports 210 and 212, respectively, such that a point in the light beam focused on imager 218 is offset or displaced one-half of a pixel width with respect to the corresponding point in the light beam focused on imager 216. Imager 220 is in optical alignment with imager 216. Since both of imagers 216 and 218 receive a green light beam, as previously noted, their output signals can be combined for developing an apparently improved resolution signal representative of the green light component of the incident light. As previously noted, this is advantageous since green is usually the most significant component of a video signal due to the sensitivity of typical image pick-up devices and the color temperature of most illumination. Furthermore, imager 216 receives blue light at each pixel in its imaging area. This results in a blue light representative imager output signal having twice the resolution and sensitivity than the blue signal derived from imager 20 of FIG. 1 since a color encoding filter is not used. Although imager 216 receives both blue and green light, the blue light component typically utilizes a relatively small portion of the dynamic range capability of the imager, thereby leaving a relatively large portion of the imager's dynamic range for responding to the green light. In this regard, it may be desirable to proportion the green light so that the portion directed to imager 216 is less than that portion directed to imager 218, e.g., 20/80 or 25/75. In either case, imager 216 receives both blue and green light.

Figure 3:
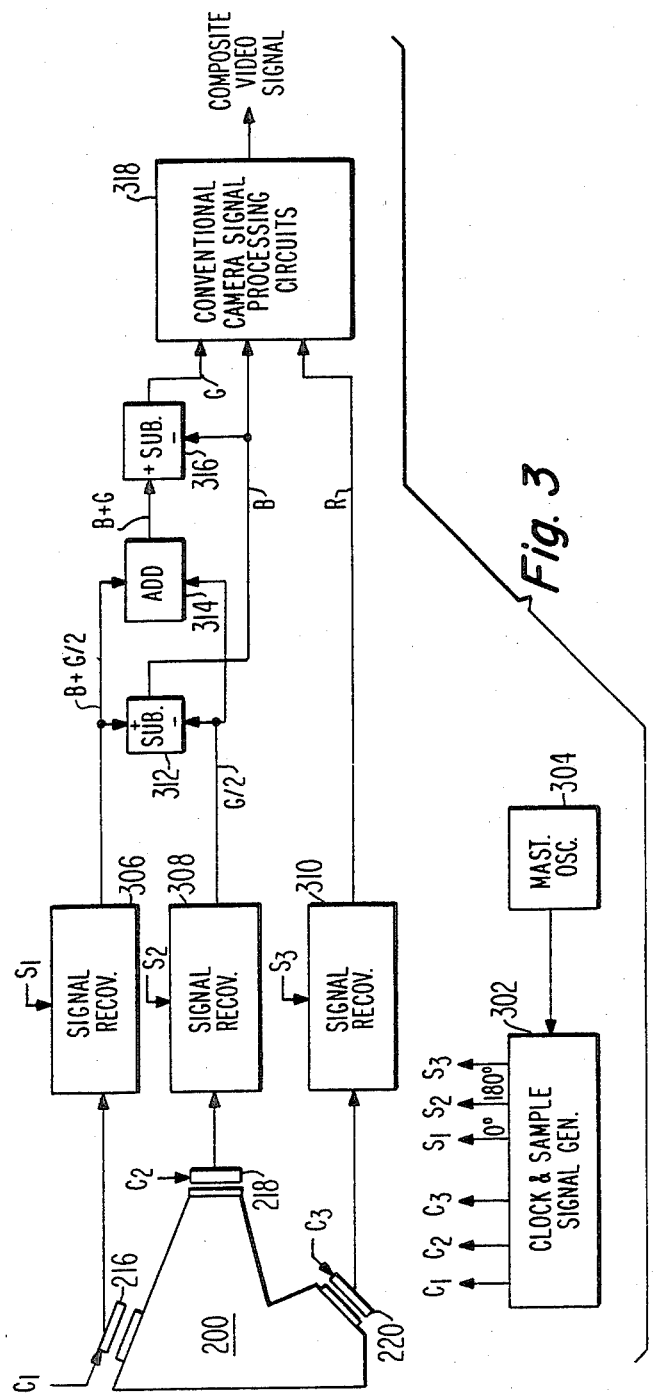
FIG. 3 illustrates in block diagram form a color television camera including the solid-state color imaging apparatus of FIG. 2.

FIG. 3 illustrates, in block diagram form, a television camera including the imaging arrangement of FIG. 2. Elements corresponding to those previously described are similarly numbered. A clock and sampling signal generator 302 is responsive to reference signals from a master oscillator 304 for developing $C_1$, $C_2$, and $C_3$ multi-phase clock signals which are applied to operate imagers 216, 218 and 220, respectively, for supplying image representative charge samples at their respective outputs as is well known. Signal recovery circuits 306, 308 and 310 are responsive to the imager supplied charge samples for developing corresponding voltage signals. Signal recovery circuits 306, 308, 310 may comprise, for example, well-known correlated double sampling circuits which receive sample pulses $S_1$, $S_2$, and $S_3$, respectively, from clock and sample signal generator 302. As previously noted, due to the spatial offset between the images received by imagers 216 and 218, the image-representative charge samples supplied by these imagers are temporally out-of-phase by 180°. Consequently, clock and sampling signal generator 302 developes the $S_1$ and $S_2$ clock signals such that they are 180° out-of-phase with respect to each other (as indicated by the plus and minus signs at the output of generator 302). As a result, the video signals supplied by signal recovery circuits 306, 308, 310 are temporally aligned. The output signal from signal recovery circuit 306 is representative of all of the blue component and one-half of the green component of the incident light while the output signal from signal recovery circuit 308 is responsive to the other one-half of the green incident light. The output R of signal recovery circuit 310 is representative of the red component of the incident light. A subtracter 312 subtracts the output signals of signal recovery circuits 306 and 308 for providing at its output a blue representative signal B and an adder 314 adds their output signals for providing a signal corresponding to the blue and green color components. As previously noted, a green signal having reduced alias components and hence an apparently increased resolution results from this addition. A subtracter 316 subtracts the blue color signal from the blue and green color signal provided at the output of 314 for developing a green color signal G. Conventional camera signal processing circuits 318 processes the red, green and blue signals for developing a composite video signal in a well known manner.

If, as previously noted, the green light component of the incident light is proportioned between imagers 216 and 218 at other than fifty/fifty, appropriate gains could be provided in signal recovery circuits 306 and 308 such that equal amplitude green component signals result at their outputs, thereby preserving the alias cancellation feature of this arrangement.

While the principles of the invention have been illustrated in a preferred embodiment, alternative embodiments are contemplated. For example, although the illustrated embodiment utilized a beamsplitter which splits the incoming light into its primary color components, it could be clear that a beamsplitter which splits the incoming light into other components, such as complementary color components as described in the previously noted U.S. Pat. No. 4,555,163, could also be utilized. Additionally, although the temporal alignment of the imager supplied signals is provided by sampling these signals utilizing sample signals which are 180° out-of-phase, temporal alignment can also be provided by inserting a signal delay into one of the signal paths. For example, an additional number of CCD stages could be provided at the output of one of the imagers for temporally aligning its output signal with that from the other imager. Finally, it may be desirable to direct both the red and green light components to the same imager instead of the blue and green, for example, if the imager was more sensitive to blue light than to red light. These and other modifications are considered to be within the scope of the following claims.

What is claimed is:

1. In a solid-state color imaging apparatus including optical means for splitting incoming light into at least first and second light beams, and first and second solid-state imagers disposed to receive said first and second light beams on respective imaging areas thereof for providing corresponding image-representing output signals, wherein the first light beam received by said first imager is offset with respect to the second light beam received by said second imager and means are provided for combining the imager output signals for developing an apparently improved resolution signal for a first color band of said incoming light, the improvement comprising:
said first light beam including only light of said first color band and said second light beam including only light of said first color band and light of a second color band of said incoming light.

2. The apparatus of claim 1 wherein:
said optical means also splits said incoming light into a third light beam including light of a third color band; and further including:
a third solid-state imager disposed to receive said third light beam.

3. The apparatus of claim 2 wherein said first color band is green, said second color band is blue and said third color band is red.

4. The apparatus of claim 2 further including:
an optical low-pass filter disposed between said optical means and said third solid-state imager.

5. In a solid-state color imaging apparatus including optical means for splitting incoming light into at least first and second light beams, and first and second solid-state imagers disposed to receive said first and second light beams on respective imaging areas thereof for providing corresponding image-representative output signals, wherein the first light beam received by said first imager is offset with respect to the second light beam received by said second imager and means are provided for combining the imager output signals for developing an apparently improved resolution signal for a first color band of said incoming light, the improvement comprising:
said first light beam including light of said first color band and said second light beam including light of said first color band and light of a second color band of said incoming light;
wherein said first light beam includes a fraction of said light of said first color band and said second light beam includes the remaining portion of said light of said first color band and all of said light of said second color band.

6. The apparatus of claim 5 wherein said fraction is equal to one-half.

7. The apparatus of claim 5 wherein said first color band is green and said second color band is blue.

8. The apparatus of claim 1 wherein:
said optical means also splits said incoming light into a third light beam including light of a third color band; and further including:
a third solid-state imager disposed to receive said third light beam.

9. A solid-state color imaging apparatus comprising:
optical means including a light input port for receiving a light beam from an object and separating said received light beam into first and second light beams at corresponding first and second light output ports, said first light beam comprising only light of a first color band and said second light beam comprising only light of said first color band and light of a second color band;
first and second solid-state imagers respectively receiving said first and second light beams and supplying output signals, each imager including an array of discrete light-sensitive photosensors in an imaging area thereof and disposed relative to a corresponding one of said first and second light output ports such that the positions of the imaging areas of said first and second solid-state imagers are relatively displaced with respect to a corresponding point in their respectively received light beams; and means for combining and processing the output signals supplied by the first and second imagers for developing an image-representative signal corresponding to said first color band which has an apparent improvement in resolution with respect to a developed image-representative signal corresponding to said second color band.

10. The apparatus of claim 9 wherein said first color band corresponds to a green color.

11. The apparatus of claim 10 wherein said second color band corresponds to a blue color.

12. The apparatus of claim 9 wherein:
said optical means also separates said received light beam into a third light beam at a third light output port and further including:
a third solid-state imager disposed to receive said third light beam at the third light output port of said optical means, the third light beam received by said third solid-state imager comprising light of a third color band.

13. The apparatus of claim 12 wherein said third color band corresponds to a red color.

14. The apparatus of claim 13 further including an optical low-pass filter disposed between said third solid-state imager and said third light output port of said optical means.

15. The apparatus of claim 9 wherein the relative displacement between the positions of the imaging areas of said first and second solid-state imagers corresponds to one-half the width of one of said discrete light-sensitive photosensors of said imagers.

16. The apparatus of claim 9 wherein:
said optical means comprises a beamsplitter having a light input port and a plurality of light output ports; said beamsplitter including color filter means disposed between said light input port and said plurality of light output ports.

17. The apparatus of claim 16 wherein:
said color filter means passes a portion of said first color band of said light received by said input port to form said first light beam and reflects the remaining portion of said first color band and all of said second color band of said light received by said input port to form said second light beam.

18. The apparatus of claim 17 wherein:
said color filter means comprises a first layer for reflecting substantially all incident light within said second color band and a second layer comprising a reflective pattern for transmitting a portion of and reflecting the remaining portion of incident light within said first color band.

19. The apparatus of claim 18 wherein said portion corresponds to one-half.

20. The apparatus of claim 19 wherein said first and second color bands correspond to green and blue colors, respectively.

* * * * *